Patented May 26, 1953

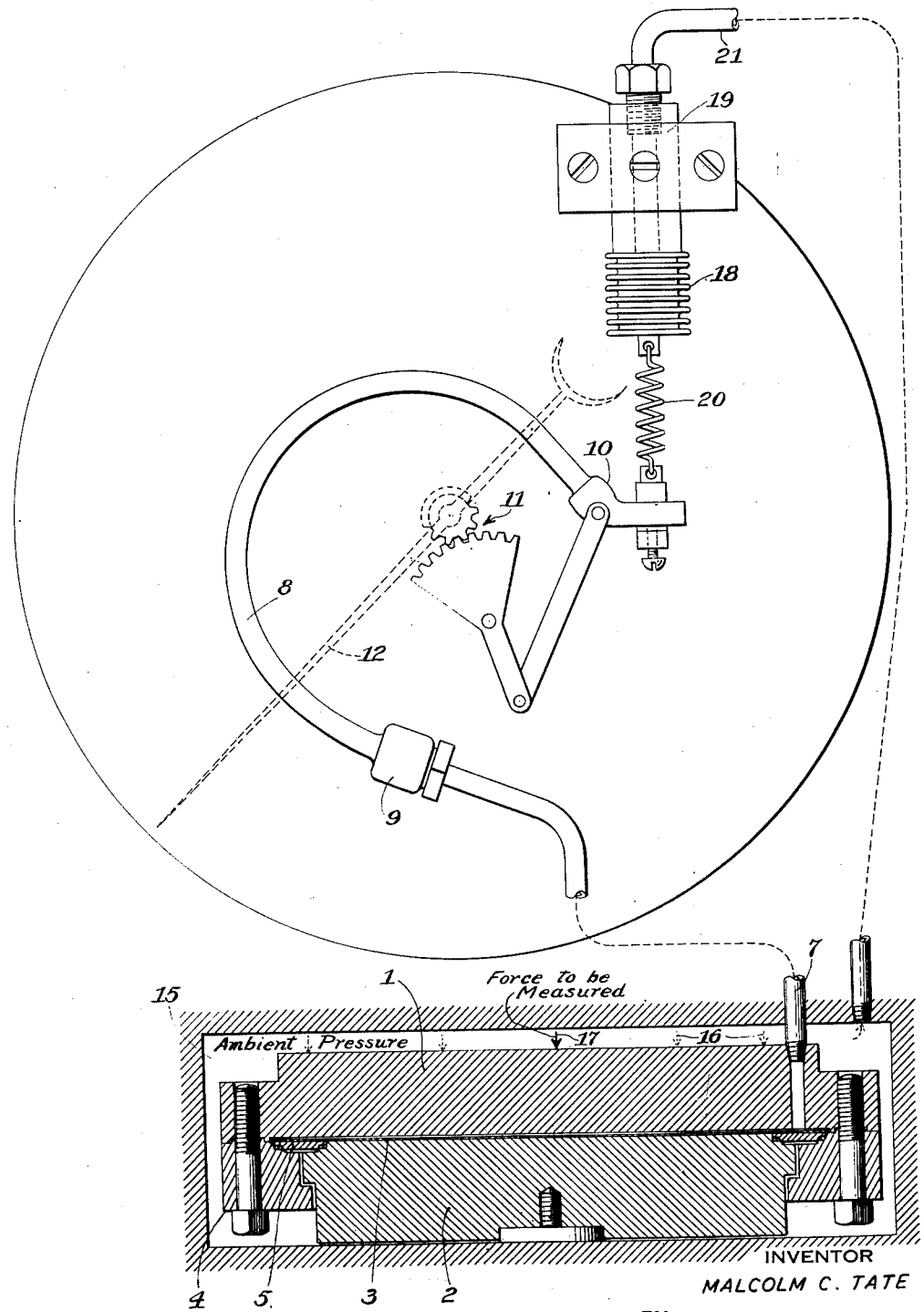

2,639,616

UNITED STATES PATENT OFFICE 2,639,616

COMPENSATED PRESSURE GAUGE

Malcolm C. Tate, Stamford, Conn., assignor to Baldwin-Lima-Hamilton Corporation, a corporation of Pennsylvania Application October 18, 1950, Serial No. 190,685

1 Claim. (Cl. 73—393)

This invention relates to pressure measuring systems and it is one object of my invention to provide an improved system and apparatus whereby pressure forces desired to be measured will be independent of certain ambient pressures which would ordinarily be superimposed on the desired pressure. More broadly, it is an object of my invention to provide means of compensating a pressure gage where the primary measurement is influenced by an undesired secondary measurement.

Other objects and advantages will be more apparent to those skilled in the art from the accompanying drawing which is a sectional view of a hydraulic load cell and the compensated indicator therefor.

To illustrate one particular application of my invention, among possible others, I may employ a load weighing cell per se, of the type shown in Emery Patent 1,848,468, located in a test chamber, where ambient pressure at the cell changes, while the pressure indicator is located outside the test chamber under atmospheric pressure. In this case the indicator would show the normal cell pressure produced by a mechanical load applied on the cell, plus the net pressure due to the difference in atmospheric pressure at the cell and at the indicator. Unless the indicator is located in the test chamber, the test chamber pressure must be compensated to eliminate the effect of the test chamber pressure on the indicator. Heretofore, it has been proposed to overcome this by mechanically connecting the movable ends of two bellows or Bourdon tubes of equal acting area, in fixed relation to each other, so that one opposes the other. Then an equal pressure change in each balances out and there is no net movement or force to actuate the indicator thereby leaving the indicator subject only to movement in the event of a change in the pressure desired to be measured. This prior arrangement is cumbersome and if the opposed elements are almost alike the total stiffness of the two may be considerable, resulting in lessened tip travel of the Bourdon tube. This arrangement is unavoidable if the range in pressures are alike. However, in the usual case of compensation one of the pressure responsive elements has a high range (cell load pressure plus ambient) while the other pressure responsive element has a low range (the ambient pressure). This means that if opposed Bourdon tubes are used in such a situation, the fixed mechanical connection between the tubes to effect the compensation is handicapping the entire instrument by practically reducing the Bourdon tube tip motion to approximately one-half of what it would be without compensation.

In my improved combination I am able to obtain a high degree of tip motion of the Bourdon tube while still being able to effectively compensate for ambient pressures so as to eliminate the same from the indicator reading. To this end I have diagrammatically illustrated the hydraulic cell as of the type described in said Emery patent, consisting of a relatively heavy circular member 1 and a so called piston 2 movable relative to each other and having a relatively thin oil chamber between the same formed by a diaphragm 3 clamped to member 1 by an annular ring 4 while the space between the piston 2 and ring 4 is bridged by an annular flexible plate 5. The fluid pressure chamber within the cell communicates by a pipe 7 to a pressure responsive element such as a Bourdon tube 8 anchored at one end 9 and its tip end 10 being free to move in response to changes of pressure in the tube as is customary with this type of device. The tip end of the tube operates a quadrant and pinion 11 to move an indicating hand 12. The hydraulic cell is, for purpose of illustration, shown enclosed within a chamber 15 which may be a wind tunnel or other enclosure where an ambient pressure is present as indicated by the dotted arrows 16 acting upon member 1 to produce a pressure in the diaphragm chamber in addition to the pressure created by a mechanical force to be measured as indicated at 17.

To eliminate the ambient pressure 16 from the reading which might be indicated by hand 12 and at the same time to permit the tip end 10 of the Bourdon tube to have as large movement as possible, I provide compensating expansible means 18 shown in this particular embodiment in the form of a bellows whose upper end is supported in a fixed position by a suitable bracket 19 and whose lower free end is connected by a pre-loaded spring 20 to the tip end of the Bourdon tube. The bellows is connected by a pipe 21 to a source of ambient pressure within chamber 15. From this it is seen that the pressure transmitted to the Bourdon tube will be equal to both the ambient pressure 16 and the mechanical force 17 but the ambient pressure will also be transmitted to bellows 18 to move its lower end downwardly and thereby reduce the tension force on spring 20 and accordingly reduce the preload force on the tip end of the Bourdon tube. It will be understood that the spring 20 is sufficiently prestressed with no pressure in the Bourdon tube so that ambient pressures may be compensated out of the reading by reducing the prestressed load which allows the Bourdon tube to collapse by an amount to compensate for the ambient pressure. The elastic connection 20 allows the Bourdon tube and bellows each to have independent strokes and it is preferable that the bellows has a relatively large area so that a given pressure change deflects a relatively large amount in relation to a similar pressure change in the Bourdon tube. By providing suitable stiffness in the elastic spring connection 20 it is possible to exert a scope of force on the Bourdon tube to get various degrees of compensating effect. Because of the magnitude of the motion of bellows 1 the construction and mounting of this bellows and spring compensating unit is not critical and, therefore, can be added to an existing Bourdon gage with little trouble while at the same time preserving the normal tip travel of the Bourdon tube which makes the instrument have good action. In fact the magnitude of the bellows motion arises partly out of the fact that the acting area of the bellows is probably 10 to 15 times the acting area of the Bourdon tube.

It is also seen that my improved combination readily permits measurement of two pressures that are to be subtracted from each other with the indicator showing the net difference or, if the bellows is placed below the Bourdon tube tip so that its position and action is reversed, then two pressures may be added.

From the foregoing disclosure it is seen that I have provided a relatively simple and highly effective means to compensate for secondary pressures in conjunction with a primary pressure to be measured in the Bourdon tube.

It will of course be understood that various changes in details of construction and arrangement of parts may be made by those skilled in the art without departing from the spirit of the invention as set forth in the appended claim.

I claim:

A pressure measuring gage comprising, in combination, a Bourdon tube having a freely expansible tip end, a fluid pressure expansible bellows having one end fixed and the other end movable in a straight line in response to second pressure, a coil spring connecting the Bourdon tube tip to the movable portion of the bellows and being expansible in a straight line substantially along the axis of the spring, and said spring being prestressed so as to effect an initial preloading on the Bourdon tube whereby the action of the Bourdon tube may be modified by the second pressure.

MALCOLM C. TATE.

References Cited in the file of this patent

UNITED STATES PATENTS

| Number | Name | Date |
|---|---|---|
| 1,070,460 | Harback | Aug. 19, 1913 |
| 1,363,415 | Hopkins | Dec. 28, 1920 |
| 1,376,505 | Berry | May 3, 1921 |
| 2,403,256 | Beck | July 2, 1943 |

FOREIGN PATENTS

| Number | Country | Date |
|---|---|---|
| 104,302 | Germany | July 13, 1899 |
| 626,206 | Germany | Feb. 21, 1936 |
| 345,696 | Italy | June 13, 1937 |